G. Kinney
Horse Hay-Fork

N° 75430     Patented Mar. 10, 1868

Witnesses
W. C. Ashkettle
Theo Tusche

Inventor
Geo Kinney
per Munn & Co
attorneys

United States Patent Office.

GEORGE KINNEY, OF BRISTOL, INDIANA.

Letters Patent No. 75,430, dated March 10, 1868.

IMPROVEMENT IN HORSE HAY-FORKS.

*The Schedule referred to in these Letters Patent and making part of the same.*

TO ALL WHOM IT MAY CONCERN:

Be it known that I, GEORGE KINNEY, of Bristol, in the county of Elkhart, and State of Indiana, have invented a new and improved Hay-Fork; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved hay-fork, simple and compact in construction, effective in operation, and which can be easily and conveniently operated; and it consists in the construction, combination, and arrangement of the various parts, as hereinafter more fully described.

Figure 1:
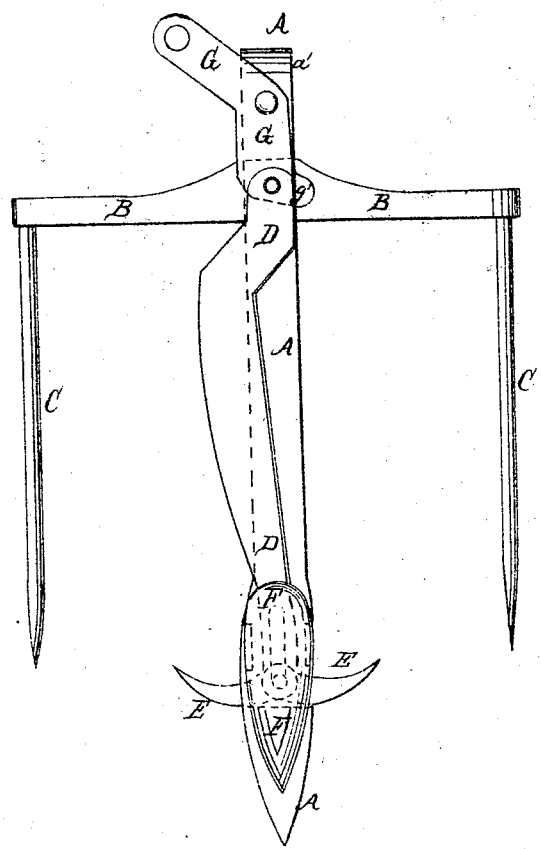
Figure 1 is a front view of my improved hay-fork.
Figure 2:
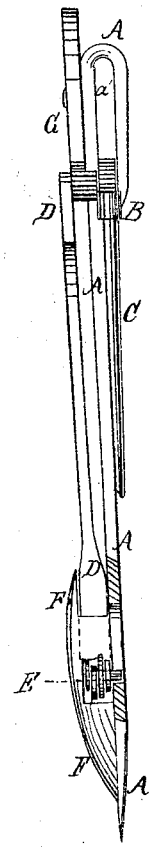
Figure 2 is an edge view of the same, parts being broken away to show the construction.

A is the main stem or central prong of the fork, the lower end of which is made sharp and pointed, so that it may easily enter the hay. The upper end of the stem A is bent over, as shown in figs. 1 and 2, to form a loop, $a'$, to receive the hoisting-rope, and also to better support the cross-bar B, which is attached to the upper part of the stem A, and to the ends of which the upper ends of the side prongs C are attached. The lower ends of the side prongs C are made pointed, and the said prongs need not be quite so long as the central prong or stem A. The middle part of the cross-bar B is placed in the space between the end and body of the stem A, and is firmly secured in place by bolts or rivets. D is an arm lying along the front side of the stem A, and to the lower end of which are pivoted the inner ends of the hooks or fingers E. F is a shield attached to the front side of the lower end of the stem A, to receive the lower end of the arm D, and also to form a cavity into which the hooks or fingers E may be drawn, said hooks or fingers passing in and out through holes in the sides of the shield F, as the arm D is moved up and down. The lower end of the shield F should be made tapering and pointed, to enable it to be more easily forced into the hay. The upper end of the arm D is pivoted to the lower end of the trip-lever G, so that by operating the said lever the arm D may be moved up and down to retract and project the hooks or fingers E. The lever G is bent, as shown in fig. 1, and is pivoted at its angle to the upper part of the stem A. The lower end of the lever G is provided with a projection or stop, $g'$, which strikes against the edge of the stem A, and stops the movement of the lever G, when the hooks or fingers E have been projected to their full extent. The upper part of the arm D may be bent or turned to one side, as shown in fig. 1, so that it may move up and down more nearly in a line with the stem A when operated by the lever G. The lower end of the arm D is guided and kept in proper position, while moving up and down, by the guide and stop-pin $d'$ attached to the rear side of the lower end of said arm, and which projects through a slot in the lower part of the stem or prong A, as shown in fig. 2, and in dotted lines in fig. 1.

In using the fork, the hoisting-rope is attached to the loop $a'$ of the stem A, and the trip-rope to the end of the trip-lever G. The lever G is then operated to draw the hooks or fingers E into the shield F, and the prongs A and C are thrust down to the desired depth in the hay. The free end of the lever G is then drawn up, which forces out the hooks or fingers E into the hay, holding the fork-load securely in place upon the prongs A and C. When the loaded fork has reached the place where the hay is to be deposited, by pulling upon the trip-rope attached to the free end of the lever G, the said free end is drawn down, raising the arm D and drawing the hooks or fingers E into the shield F, which allows the hay to drop from the prongs A and C.

I claim as new, and desire to secure by Letters Patent—

The combination of the stem or central prong A, cross-bar B, side prongs C, arm D, pivoted hooks or fingers E, shield F, and trip-lever G, with each other, said parts being constructed and arranged substantially as herein shown and described and for the purpose set forth.

GEORGE KINNEY.

Witnesses:
ISAAC WILLIAMSON,
L. E. HAMSHER.